(12) United States Patent
Hess et al.

(10) Patent No.: US 10,489,280 B2
(45) Date of Patent: Nov. 26, 2019

(54) METHOD AND APPARATUS FOR TEST MODELING

(71) Applicant: International Business Machines Corporation, Armonk, NY (US)

(72) Inventors: Howard Hess, Winnetka, IL (US); Eitan Farchi, Pardes Hana (IL); Orna Raz, Haifa (IL); Rachel Tzoref-Brill, Haifa (IL); Aviad Zlotnick, Mitzpeh Netofah (IL)

(73) Assignee: International Business Machines Corporation, Armonk, NY (US)

(*) Notice: Subject to any disclaimer, the term of this patent is extended or adjusted under 35 U.S.C. 154(b) by 105 days.

(21) Appl. No.: 15/818,770

(22) Filed: Nov. 21, 2017

(65) Prior Publication Data

US 2019/0155717 A1  May 23, 2019

(51) Int. Cl.
*G06F 9/44* (2018.01)
*G06F 11/36* (2006.01)
*G06Q 40/08* (2012.01)

(52) U.S. Cl.
CPC ......... *G06F 11/3668* (2013.01); *G06Q 40/08* (2013.01)

(58) Field of Classification Search
CPC .................................................. G06F 11/3668
USPC ........................................................ 717/124
See application file for complete search history.

(56) References Cited

U.S. PATENT DOCUMENTS

| | | | |
|---|---|---|---|
| 8,813,036 B2 | 8/2014 | Tzoref-Brill | |
| 9,244,819 B2 | 1/2016 | Farchi et al. | |
| 9,569,343 B2 | 2/2017 | Boden et al. | |
| 2009/0271339 A1* | 10/2009 | Chapelle | G06N 20/00 706/12 |
| 2010/0274520 A1 | 10/2010 | Ur et al. | |
| 2013/0091382 A1 | 4/2013 | Segall et al. | |
| 2013/0262017 A1* | 10/2013 | Segall | G06F 11/263 702/108 |
| 2013/0275939 A1* | 10/2013 | Tzoref-Bill | G06F 11/3676 717/105 |

(Continued)

OTHER PUBLICATIONS

Title: Model-based search for combinatorial optimization: A critical survey; author: M Zlochin et al, dated: 2004.*

(Continued)

*Primary Examiner* — Chameli Das
(74) *Attorney, Agent, or Firm* — Ziv Glasberg

(57) ABSTRACT

A method, system and computer program product, the method comprising: receiving a partial description of a combinatorial model defining a test space and comprising a set of attributes, a respective domain for each attribute defining possible values for the attribute, and restrictions, each comprising an attribute, a respective value and a logical operator, the partial description comprising an attribute and a value thereof; computing a similarity measurement between the partial description and each model in a corpus, based on similarity of attributes and domains, and not on a test space defined by compared models, whereby similarity between models is indifferent to a size of the test space of the models; selecting models from the corpus according to the computed similarity measurements; determining elements from the selected models to be suggested for modifying the partial description; and outputting the suggestions to modify the partial description useful for completing the combinatorial model.

19 Claims, 2 Drawing Sheets

(56) References Cited

U.S. PATENT DOCUMENTS

Figure 1:
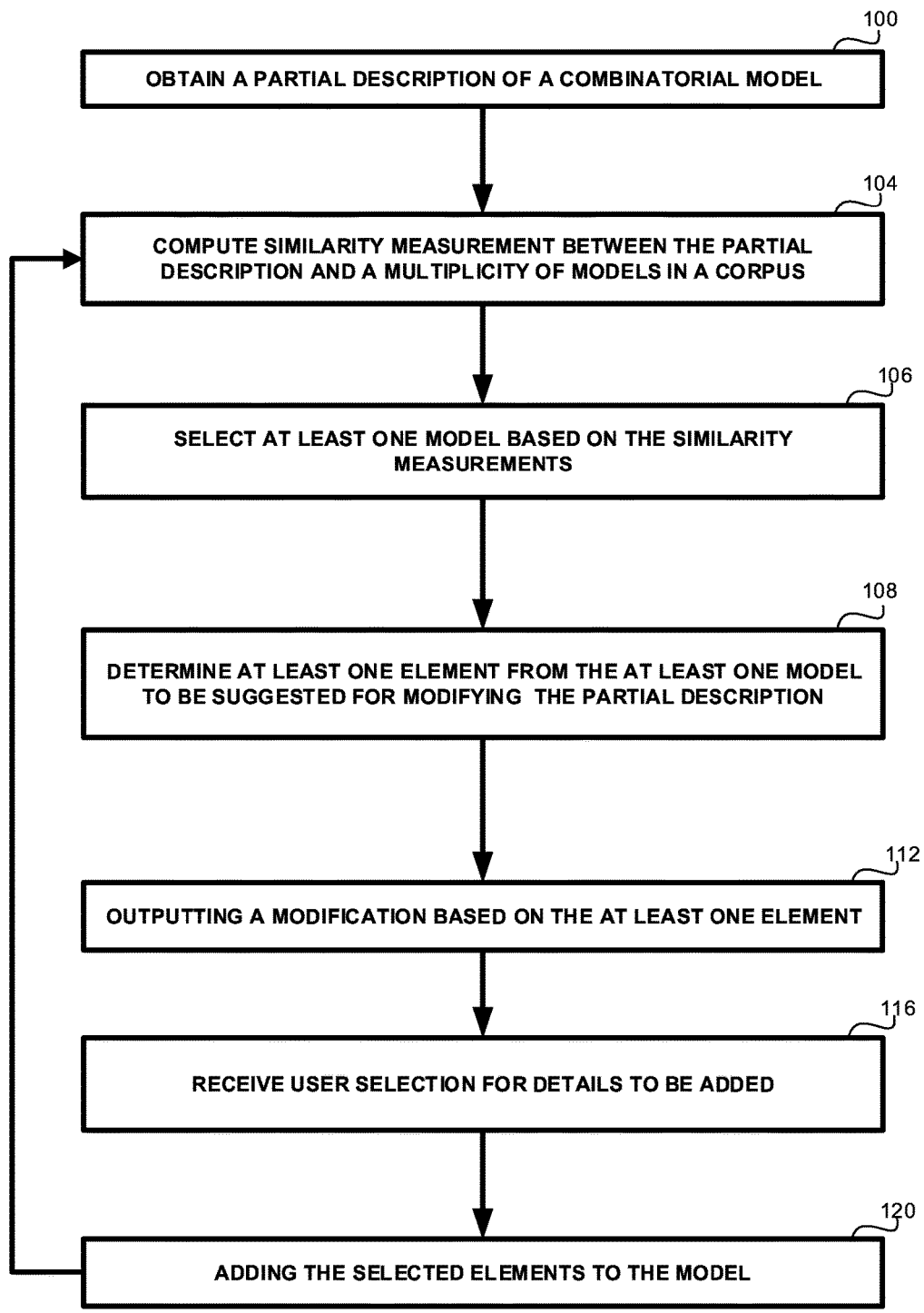

| | | | |
|---|---|---|---|
| 2015/0095390 A1* | 4/2015 | Gajjar | G06K 9/6203 |
| | | | 708/441 |
| 2015/0254167 A1 | 9/2015 | Farchi et al. | |
| 2017/0004430 A1* | 1/2017 | Auradkar | G06Q 10/06313 |
| 2017/0332118 A1* | 11/2017 | Gopalan | H04N 21/252 |
| 2018/0198732 A1* | 7/2018 | Karthikeyan | H04L 67/322 |

OTHER PUBLICATIONS

Title: Logical analysis of data—An overview: From combinatorial optimization to medical applications, author: Peter L Hammer, published on 2006.*

Segall et al., "Simplified Modeling of Combinatorial Test Spaces", 2012 IEEE Fifth International Conference on Software Testing, Verification and Validation, Apr. 2012, pp. 573-579.

El-Far et al., "Model-based Software Testing", Encyclopedia on Software Engineering (edited by J.J. Marciniak), Wiley, 2001.

* cited by examiner

METHOD AND APPARATUS FOR TEST MODELING

TECHNICAL FIELD

The present disclosure relates to testing in general, and to a method and apparatus for generating models for testing using existing models, in particular.

BACKGROUND

Effective software testing is crucial to achieving a competitive software product. Testing may be part of any stage of the product development, including design, unit testing, system testing or the like. Testing may be planned and implemented by generating and executing a test model.

A combinatorial model, also referred to as Cartesian-product model, is a set of attributes, values or value ranges for the attributes (also referred to as domains), and restrictions on value combinations that may not appear together. Such a model spans a space of valid tests for a tested design, unit, system or any other entity: each combination of values to the attributes that does not violate any restriction corresponds to a valid test. Each combination of attributes or a subset of attributes, which is excluded by one or more restrictions, is referred to as an illegal combination.

For example, a model for testing a computer may comprise a CPU attribute with possible values consisting of the available CPUs, an operating system (OS) attribute with possible values consisting of the available Oss, and restrictions that rule out impossible of CPU and OS combinations, such as a low performance CPU with modern high-resource-consuming OS.

Combinatorial models have a variety of usages. One such usage is functional coverage analysis of a System Under Test (SUT). Another usage is in Combinatorial Test Design (CTD). CTD is a test planning technique that selects a small subset of the valid test space that covers a predefined coverage goal. The coverage goal may define an interaction level of attributes that are to be covered, such as every n-wise combinations of values.

Preparing a combinatorial model may be a difficult task for a user, such as a verification engineer, a QA staff member, or the like. In particular, correctly capturing the restrictions over the model may be an important yet work-intensive and non-trivial task. Under-restricting the model may yield tests that cannot be executed and may cause coverage gaps if such tests are skipped or manually modified. Over-restricting the model also yields coverage gaps in the areas that are wrongly restricted.

BRIEF SUMMARY

One exemplary embodiment of the disclosed subject matter is a computer-implemented method comprising: receiving a partial description of a combinatorial model, the combinatorial model defining a test space, the combinatorial model comprising a set of attributes, a respective domain for each attribute defining possible values for the attribute, and restrictions, wherein each restriction of the restrictions comprises one or more attributes, a respective value thereof and a logical operator, wherein the partial description comprising one or more attributes of the set of attributes and one or more values for the attributes; computing a similarity measurement between the partial description and each model in a corpus of existing combinatorial models, wherein the similarity measurement is computed based on similarity of attributes and respective domains thereof and not based on the test space defined by models being compared, whereby similarity between models is indifferent to a size of the test space of the models; selecting one or more selected models from the corpus of existing combinatorial models in accordance with similarity measurements computed for the existing combinatorial models; determining one or more elements from the one or more selected models to be provided as a modification suggestion for modifying the partial description; and outputting the modification suggestion to modify the partial description based on the one or more elements, whereby the modification suggestion is useful in completing the partial description to create the combinatorial model.

Another exemplary embodiment of the disclosed subject matter is a system having a processor, the processor being adapted to perform the steps of: receiving a partial description of a combinatorial model, the combinatorial model defining a test space, the combinatorial model comprising a set of attributes, a respective domain for each attribute defining possible values for the attribute, wherein each restriction comprises one or more attribute, a respective value thereof and a logical operator, wherein the partial description comprising one or more attributes of the set of attributes and one or more values for the attributes; computing a similarity measurement between the partial description and each model in a corpus of existing combinatorial models, wherein the similarity measurement is computed based on similarity of attributes and respective domains thereof and not based on the test space defined by models being compared, whereby similarity between models is indifferent to a size of the test space of the models; selecting one or more selected models from the corpus of existing combinatorial models in accordance with similarity measurements computed for the existing combinatorial models; determining one or more elements from selected models to be provided as a modification suggestion for modifying the partial description; and outputting the modification suggestion to modify the partial description based on the one or more elements, whereby the modification suggestion is useful in completing the partial description to create the combinatorial model.

Yet another exemplary embodiment of the disclosed subject matter is a computer program product comprising a non-transitory computer readable medium retaining program instructions, which instructions when read by a processor, cause the processor to perform a method comprising: receiving a partial description of a combinatorial model, the combinatorial model defining a test space, the combinatorial model comprising a set of attributes, a respective domain for each attribute defining possible values for the attribute, wherein each restriction comprises one or more attributes, a respective value thereof and a logical operator, wherein the partial description comprising one or more attributes of the set of attributes and one or more values for the attributes; computing a similarity measurement between the partial description and each model in a corpus of existing combinatorial models, wherein the similarity measurement is computed based on similarity of attributes and respective domains thereof and not based on the test space defined by models being compared, whereby similarity between models is indifferent to a size of the test space of the models; selecting one or more selected models from the corpus of existing combinatorial models in accordance with similarity measurements computed for the existing combinatorial models; determining one or more elements from selected models to be provided as a modification suggestion for modifying the partial description; and outputting the modification suggestion to modify the partial description based on the one or more elements, whereby the modification suggestion is useful in completing the partial description to create the combinatorial model.

THE BRIEF DESCRIPTION OF THE SEVERAL VIEWS OF THE DRAWINGS

Figure 2:
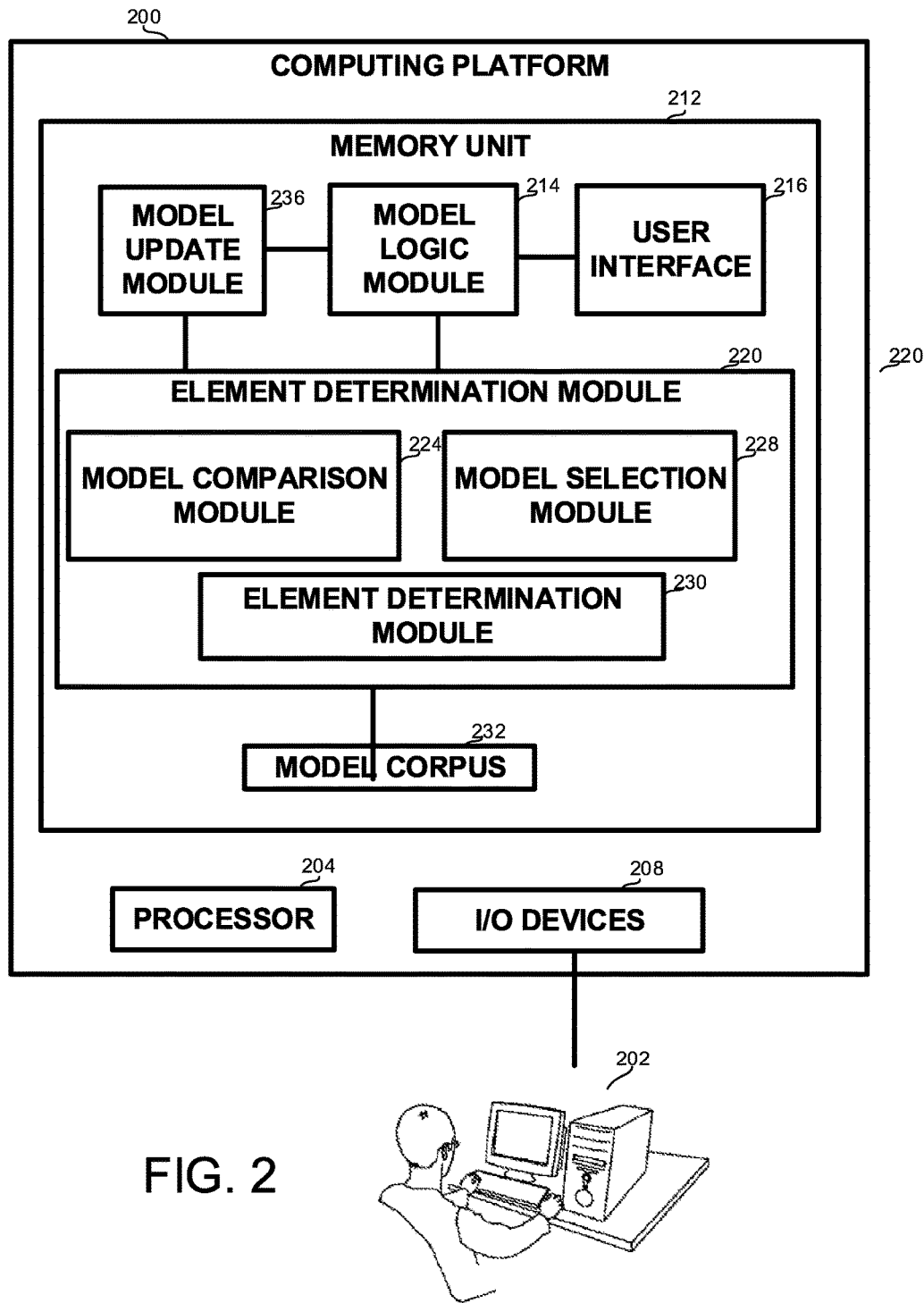

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a flowchart diagram of a method of generating testing models, in accordance with some exemplary embodiments of the disclosed subject matter; and FIG. 2 shows a block diagram of a computing device configured for generating testing models, in accordance with some exemplary embodiments of the disclosed subject matter.

DETAILED DESCRIPTION

Testing is an important part of the development of any new product. Testing can and should be integrated with any stage of the development, including design, implementation, unit testing, integration, or the like.

Testing may require a model of the test space of the system or environment. If a model of the test space exists, various technologies may be utilized to ease and even automate the test planning, reduction, and execution tasks. However, creating a model is a challenging task that requires manual effort and expert skills and knowledge.

A combinatorial model, also referred to as Cartesian-product model, is a set of attributes, values or value ranges for the attributes (also referred to as domains), and restrictions of one or more types on value combinations that may not appear together, the restriction comprising at least one attribute, a respective value thereof and a logical operator.

Such a model spans a space of valid tests for a tested design, unit, system or any other entity: each combination of values to the attributes that does not violate any restriction corresponds to a valid test. Each combination of attributes or a subset of attributes, which is excluded by one or more restrictions, is referred to as an illegal combination.

For example, a testing model for a software system may comprise an attribute of an operating system (OS) attribute having possible values of Windows, Linux, iOS, etc., and a browser attribute having possible values of Internet Explorer (IE) and Chrome. Since the IE browser can only work with Windows OS, a restriction can be set that bars the combinations of the Linux OS and IE, and the iOS and IE.

Another example relates to a model used by a car insurance company:

A quotation attribute may have values: New_Lenghty, New_Quick Requote_Lenghty, or Requote_Quick.

A Policy_Type attribute may have values: New, Renewal or Endorsement.

A Policy_end_date attribute may have values: greater_than_7to12_months_of_start_date, greater_than_4to6_months_of_start_date, greater_than_1to3_months_of_start_date, same_as_Policy_start_Date or Less_than_Start_date.

A Vehicle_type attribute may have values: A, B, C or D.

A Type_of_Vehicle attribute may have values: Existing, Old or New

An Age_of_vehicle attribute may have values: 0-1, 2-5, 6-10, 11-15 or over 15.

A Vehicle_Market_value_dollars attribute may have values: 1000-3000, 3000-5000, 5000-10000, 10000-15000, 15000-20000, or over 20000.

A Policy_start_date attribute may have values: Futuredate<365_dates, Current_Date, Lessthan_current_Date, Less_7_days_of_end_Date, or Futuredate>365_dates.

Additional attributes may include Emergency_Road_Service, Rental_reimbruisment, Upgraded_Accident_Forgiveness, Personal_Injury_Protection, Electrical_Accessories_value, Non_Electrical_Accessories, Collision, Excess_vehicle, Loyalty, Number_of_Claims, Type_of_Antitheft, Customer_Gender, Is_customer_also_driver, Customer_Age_group, Driver_Age_group, Named_or_Unnamed_driver, Number_of_Drivers, Driver_Experience, No_of_Major_Violations, and Parking_Type.

Exclusion restriction examples may include:
Policy_Type="Renewal" and Loyalty "0 Years"
Age_of_vehicle="0-1" and Vehicle_Market_value_dollars.equals("1000")
Vehicle_type="A" and Age_of_vehicle="0-1" and Vehicle_Market_value_dollars="greaterthan20000"
Vehicle_type="B" and Age_of_vehicle="11-15" and Vehicle_Market_value_dollars="1000-3000"'

If-then restrictions may include:
(Policy_Type=New)==>(Loyalty=0 Years)
(Driver_Age=Lessthan18)→(Driver_experience=1-2)\
(Vehicle_type=B AND Age_of_vehicle=11-15)==>(Vehicle_Market_value_dollars==1000-3000, 3000-5000, 5000-10000)

If and only if restriction may be:
(Excess_Vehicle=None)==>(Vehicle_Count=0)

One technical problem dealt with by the disclosed subject matter is the need to generate testing models for new systems. Nowadays there is a crucial need in safety-critical systems that test designers specify, write and verify certain properties early in their design process. However, designers are often not experts in the field of the tested system and may not be proficient in the languages used to define the specification property. Moreover, even for experienced designers, time is of essence, thus it is always desired to speed the model development.

Although the disclosure below relates to combinatorial models, the disclosure is not limited to such models, and models of other types may be generated in an analogous manner.

Often, models exist in which such knowledge has already been compiled or captured for other purposes. Examples include other models, associated for example with similar products, previous versions of a developed product, partial systems, or the like, which have parts that may be utilized to the current problem space.

Thus, one technical solution is a user-guided automatic or semi-automatic model generation, which uses data comprised in a corpus of available models, in which each model may contain a collection of attributes, possible values or value ranges for each attribute, and one or more restrictions, wherein a restriction defines one or more combinations of attribute values that are illegal and are excluded from a legal test case.

Model generation may start with the user indicating at least one attribute, with or without at least one possible value and/or a restriction of the generated model. The system then searches the model corpus for models having the at least one attribute, possible value or restriction, or similar entities, and suggests to the user to modify the model by adding the attribute or the restriction to the model, or add the value to a currently selected attribute of the model. For example, if the user has entered into the model an attribute name "Family name", the system may find that another model having a "Family name" attribute also has a "First Name" attribute and automatically suggest to the user to add this attribute to the model being built. Additional exemplary schemes for selecting attributes, values or restrictions to be added are detailed below.

One technical effect of the disclosure provides for fast and efficient model generation, where attributes, values or restrictions are suggested to be added to the model, thus saving a user generating the model time and labor, and reducing the time required for providing a testing model. Typically, the generation process may accelerate as work proceeds, since as more elements of the model are available, the more specific is the search for additional ones, and the higher is the probability of receiving suitable modification suggestions.

Another technical effect of the disclosure relates to keeping uniformity and standard compliance between models, by using, for example, the same spelling for attribute names or values, the same values for attributes, the same restrictions where applicable, or the like.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

The term "element" as used herein is to be widely construed as any one or more parts of a model. For example, in a combinatorial model an element may be an attribute, an attribute value, a collection of attribute values, a restriction, or the like.

Referring now to FIG. 1, showing a method for generating a testing model in accordance with some embodiments of the disclosure.

On step 100, a partial description of a model may be received, for example from a user using one or more Input/Output (I/O) devices to operate a user interface. In some embodiments, companies or other entities providing a multiplicity of products or versions thereof may maintain one or more basic or initial models that can serve as a basis for specific model generation.

On step 104, a similarity measurement can be computed between the partial model and a multiplicity of models in a corpus available for comparison.

Comparison can take place between the model being generated and one or more individual models within the corpus. Alternatively or additionally, comparison can take place between the model being generated and a conjunction or disjunction between two or more models of the corpus.

In one example, comparison can relate to comparing Cartesian products of two models, wherein a Cartesian product comprises a combination of values assigned to two or more attributes. Thus, Cartesian product comprised in two models increases the similarity score between the models.

Alternative comparisons may include determining whether two compared models have corresponding attributes, wherein corresponding attributes may relate to attributed having the same, or similar, name and type. The more attributes common to two models, the higher is the similarity score therebetween.

Further comparisons may include determining similarity between the sets of values associated with one or more attributes. High similarity, e.g., having the exact same value set for one or more attributes increases the similarity score between models.

Yet further comparisons may relate to comparing sets of attribute names and values, Yet further comparisons may relate to the restrictions applied to the Cartesian product. Identical or similar restrictions require identical or similar attributes and values, and similar logic, and thus imply high degree of similarity between models, resulting in high similarity score.

Yet further comparisons may relate to the model as a whole, comprising attribute names, attribute values and restrictions.

In some embodiments, history of generating past models may be retained and used. For example, if an element found appropriate for suggesting has been suggested during generation of previous models and repeatedly accepted by users, it may receive higher priority and be suggested in future model generations as well.

It will be appreciated that the more similar elements between models, the higher is the similarity score. The various elements may have different weights when calculating the similarity score. For example, a similar or identical value set may imply higher score than an attribute, a restriction may imply higher score than attribute or value, or the like, It will also be appreciated that similarity, for example of names may or may not be exact. For example, names may be searched I a fuzzy manner with different spelling, with common spelling mistakes, in singular/plural forms, or the like.

On step 106, given the similarity measurements between the model being generated and one or more of the models in the corpus, at least one model may be selected, based on the similarity measurements. For example, a predetermined number of models having the highest similarity can be selected, a predetermined percentage of the models having the highest similarity can be selected, all models having similarity measurement exceeding a threshold can be selected, or the like.

On step 108, at least one element, such as an attribute, a value of an attribute or a restriction may be determined from the selected models to be used as a modification suggestion to the partial model.

Determination can be performed in a multiplicity of manners. In some exemplary embodiments of the disclosure, one or more elements from a model having a relatively high, for example, the highest similarity score to the generated model, may be selected. The specific element or elements to be suggested can be determined from the model arbitrarily or based on predetermined criteria or priorities. For example, the following priorities may be applied in descending order: restrictions present in the corpus model and not present in the generated model which are applicable to attributes and values common to the two models; if the two models have the same attribute and one or more common values, then additional values present in the corpus model and not present in the generated model can be suggested; additional attributes; changing highly similar but non-identical attributes, or the like.

In other embodiments, modification suggestions can be determined based on elements common to at least two of the selected corpus models. For example, if two or more models having the same common elements with the generated models also have common elements not present in the generated models, such elements can be suggested to be added to the generated model. In particular, as elements are common to more corpus models, they may be assigned with higher priority of being suggested to the user. In further embodiments, the determined elements can include an element that is comprised in a number of models from the selected models that exceeds a threshold.

On step 112, once one or more modification suggestions are determined, the user interface may suggest to the user the modification comprising the elements. The elements may be presented to the user one at a time, and the user may accept or reject each or them individually. Alternatively, a plurality of suggested modifications may be displayed to the user and the user may select the ones to be added, for example by clicking on check boxes. In yet another alternative, a multiplicity of elements can be suggested as a block, which the user can accept or reject. In further embodiments, a full model can be suggested as a modifier for the generated model.

On step 116, user selection may be received regarding one or more elements to be added to the model. The user may select through a user interface showing the various elements or groups thereof, for example using check boxes.

On step 120, the selected elements may be added to the model. The model is thus enhanced with the modification, and execution can return to model comparison step 104 for searching the model corpus for further elements to be added.

It will be appreciated that at any stage a user can manually continue generating the mode, for example manually add or change attributes, values, restrictions or the like.

Referring now to FIG. 2 showing a block diagram of a computing platform, in accordance with some exemplary embodiments of the disclosed subject matter.

A computing platform 200 depicted in FIG. 2, may be configured to assist a user 202 in generating a model such as a combinatorial model, based on existing model corpus.

In some exemplary embodiments computing platform 200 may comprise a processor 204, which may be a Central Processing Unit (CPU), a microprocessor, an electronic circuit, an Integrated Circuit (IC) or the like. Processor 204 may be utilized to perform computations required by computing platform 200 or any of it subcomponents. Processor 204 may be configured to execute computer-programs useful in performing the method of FIG. 1.

In some exemplary embodiments, one or more I/O devices 208 may be configured to receive input from and provide output to user 202. In some exemplary embodiments, I/O devices 208 may be utilized to present to user 202 a model, elements to be added or other data or options visually on a display device and/or vocally using a speaker. I/O devices 208 may also be utilized to obtain user input instructions useful in generating the model, such as keyboard input, input from a pointing device such as a mouse or a touch screen, or the like.

In some exemplary embodiments, a memory unit 212 may be a short-term storage device or long-term storage device. Memory unit 212 may be a persistent storage or volatile storage. Memory unit 212 may be a disk drive, a Flash disk, a Random Access Memory (RAM), a memory chip, or the like. In some exemplary embodiments, memory unit 212 may retain program code operative to cause processor 204 to perform acts associated with any of the subcomponents of computing platform 200. In some exemplary embodiments, memory unit 212 may retain program code operative to cause processor 204 to perform acts associated with any of the steps shown in FIG. 1 above.

The components detailed below may be implemented as one or more sets of interrelated computer instructions, executed for example by processor 204 or by another processor. The components may be arranged as one or more executable files, dynamic libraries, static libraries, methods, functions, services, or the like, programmed in any programming language and under any computing environment.

Memory unit 212 may retain model logic module 214 configured for maintaining one or more models such as combinatorial models, for example as a data structure, making sure the model is consistent, performing operations on a model such as adding, deleting or chaning elements, or the like.

Memory unit 212 may retain user interface 216, which may be a graphic user interface (GUI), for presenting to user 202 over any one or more of I/O devices 208 a model, modification suggestions, or the like, and receiving from user 202 over any one or more of I/O devices 208 input such as new or updated model elements, relationships between elements, element order, restrictions, or the like. User interface 216 can further react to user responses to modification suggestions.

Memory unit 212 may retain element determination module 220, for determining suggestions to elements to be added to the model.

Element determination module 220 may comprise model comparison module 224, configured for computing a similarity measure between a generated model and a models from a corpus model, as described in association with step 104 of FIG. 1.

Element determination module 220 may comprise model selection module 228 configured for selecting one or more models from the model corpus.

Element determination module 220 may comprise element determination module 230 for determining one or more elements from the selected models to be suggested for modifying the generated model.

elements from one or more corpus models based on the similarity measurements determined by model comparison module 224.

Element determination module 220 compares the generated model and retrieves elements from models stored in model corpus 232. Model corpus 232 may be stored on memory unit 212 or on a memory device operatively connected to memory unit 212. Model corpus 232 may retain one or more models, whether partial or complete, which can serve as a basis for generating further models.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
   receiving a partial description of a combinatorial model, the combinatorial model defining a test space, the combinatorial model comprising a set of attributes, a respective domain for each attribute defining possible values for the attribute, and restrictions, wherein each restriction of the restrictions comprises at least one attribute, a respective value thereof and a logical operator, wherein the partial description comprising at least one attribute of the set of attributes and at least one value for the at least one attribute;
   computing a similarity measurement between the partial description and each model in a corpus of existing combinatorial models, wherein the similarity measurement is computed based on similarity of attributes and respective domains thereof and not based on the test space defined by models being compared, whereby similarity between models is indifferent to a size of the test space of the models;
   selecting one or more selected models from the corpus of existing combinatorial models in accordance with similarity measurements computed for the existing combinatorial models;
   determining one or more elements from the one or more selected models to be provided as a modification suggestion for modifying the partial description, the one or more elements comprising at least one additional attribute not included in the partial description, wherein subject to the existing corpus of models comprising a multiplicity of models each comprising the at least one attribute and the at least one value, setting the modification suggestion to comprise an element that is comprised in a number of models from the multiplicity of models that exceeds a threshold; and
   outputting the modification suggestion to modify the partial description based on the one or more elements, the modification suggestion comprising a suggestion to modify the partial description to include the at least one additional attribute, whereby the modification suggestion is useful in completing the partial description to create the combinatorial model.

2. The computer-implemented method of claim 1, wherein the at least one restriction comprises an illegal combination of attribute values.

3. The computer-implemented method of claim 2, wherein the similarity measurement is determined in accordance with common restrictions on combinations of attributes and values.

4. The computer-implemented method of claim 2, wherein the similarity measurement is determined in accordance with common attributes.

5. The computer-implemented method of claim 2, wherein the similarity measurement is determined in accordance with common attribute values.

6. The computer-implemented method of claim 2, wherein the similarity measurement is determined in accordance with common attributes and values thereof.

7. The computer-implemented method of claim 1, wherein subject to the existing corpus of models comprising a multiplicity of models each comprising the at least one attribute and at least one value, setting the modification suggestion to comprise at least one second attribute or at least one second value comprised in at least one of the multiplicity of models.

8. The computer-implemented method of claim 1, wherein the element is selected from a group consisting an attribute and a value.

9. The computer-implemented method of claim 1, wherein subject to the existing corpus of models comprising a multiplicity of models each comprising the at least one attribute or at least one value, setting the modification suggestion to comprise at least one second attribute or at least one second value comprised in a model from the one or more selected models.

10. A system having a processor, the processor being adapted to perform the steps of:
    receiving a partial description of a combinatorial model, the combinatorial model defining a test space, the combinatorial model comprising a set of attributes, a respective domain for each attribute defining possible values for the attribute, wherein each restriction comprises at least one attribute, a respective value thereof and a logical operator, wherein the partial description comprising at least one attribute of the set of attributes and at least one value for the at least one attribute;
    computing a similarity measurement between the partial description and each model in a corpus of existing combinatorial models, wherein the similarity measurement is computed based on similarity of attributes and respective domains thereof and not based on the test space defined by models being compared, whereby similarity between models is indifferent to a size of the test space of the models;
    selecting one or more selected models from the corpus of existing combinatorial models in accordance with similarity measurements computed for the existing combinatorial models;
    determining one or more elements from selected models to be provided as a modification suggestion for modifying the partial description, the one or more elements comprising at least one additional attribute not included in the partial description, wherein subject to the existing corpus of models comprising a multiplicity of models each comprising the at least one attribute and the at least one value, setting the modification suggestion to comprise an element that is comprised in a number of models from the multiplicity of models that exceeds a threshold; and
    outputting the modification suggestion to modify the partial description based on the one or more elements, the modification suggestion comprising a suggestion to modify the partial description to include the at least one additional attribute, whereby the modification suggestion is useful in completing the partial description to create the combinatorial model.

11. The system of claim 10, wherein the at least one restriction comprises an illegal combination of attribute values.

12. The system of claim 11, wherein the similarity measurement is determined in accordance with common restrictions on combinations of attributes and values.

13. The system of claim 11, wherein the similarity measurement is determined in accordance with common attributes.

14. The system of claim 11 wherein the similarity measurement is determined in accordance with common attribute values.

15. The system of claim 11, wherein the similarity measurement is determined in accordance with common attributes and values thereof.

16. The system of claim 10, wherein subject to the existing corpus of models comprising a multiplicity of models each comprising the at least one attribute and at least one value, setting the modification suggestion to comprise at least one second attribute or at least one second value comprised in at least one of the multiplicity of models.

17. The system of claim 10, wherein the element is selected from a group consisting an attribute and a value.

18. The system of claim 10, wherein subject to the existing corpus of models comprising a multiplicity of models each comprising the at least one attribute or at least one value, setting the modification suggestion to comprise at least one second attribute or at least one second value comprised in a model from the one or more selected models.

19. A computer program product comprising a non-transitory computer readable medium retaining program instructions, which instructions when read by a processor, cause the processor to perform a method comprising:

receiving a partial description of a combinatorial model, the combinatorial model defining a test space, the combinatorial model comprising a set of attributes, a respective domain for each attribute defining possible values for the attribute, wherein each restriction comprises at least one attribute, a respective value thereof and a logical operator, wherein the partial description comprising at least one attribute of the set of attributes and at least one value for the at least one attribute;

computing a similarity measurement between the partial description and each model in a corpus of existing combinatorial models, wherein the similarity measurement is computed based on similarity of attributes and respective domains thereof and not based on the test space defined by models being compared, whereby similarity between models is indifferent to a size of the test space of the models;

selecting one or more selected models from the corpus of existing combinatorial models in accordance with the similarity measurements computed for the existing combinatorial models;

determining one or more elements from the one or more selected models to be provided as a modification suggestion for modifying the partial description, the one or more elements comprising at least one additional attribute not included in the partial description, wherein subject to the existing corpus of models comprising a multiplicity of models each comprising the at least one attribute and the at least one value, setting the modification suggestion to comprise an element that is comprised in a number of models from the multiplicity of models that exceeds a threshold; and outputting the modification suggestion to modify the partial description based on the one or more elements, the modification suggestion comprising a suggestion to modify the partial description to include the at least one additional attribute, whereby the modification suggestion is useful in completing the partial description to create the combinatorial model.

* * * * *